US007269650B2

(12) United States Patent
Hamdan

(10) Patent No.: US 7,269,650 B2
(45) Date of Patent: Sep. 11, 2007

(54) SYSTEM FOR AUTOMATICALLY CREATING A CONTEXT INFORMATION PROVIDING CONFIGURATION

(75) Inventor: Amen Hamdan, Stuttgart (DE)

(73) Assignee: Sony Deutschland GmbH, Koeln (DE)

( * ) Notice: Subject to any disclaimer, the term of this patent is extended or adjusted under 35 U.S.C. 154(b) by 782 days.

(21) Appl. No.: 10/255,426

(22) Filed: Sep. 26, 2002

(65) Prior Publication Data

US 2003/0065501 A1 Apr. 3, 2003

(30) Foreign Application Priority Data

Sep. 28, 2001 (EP) ................... 01123473

(51) Int. Cl.
*G06F 9/46* (2006.01)
(52) U.S. Cl. .................................... 709/224
(58) Field of Classification Search ............... 709/201, 709/202, 203, 217, 218, 219, 224; 715/734, 715/744, 748
See application file for complete search history.

(56) References Cited

U.S. PATENT DOCUMENTS

| 6,920,616 B1 * | 7/2005 | Abbott et al. ............. 715/744 |
| 7,213,048 B1 * | 5/2007 | Parupudi et al. ........... 709/203 |
| 2002/0188426 A1 * | 12/2002 | Datta et al. ............... 702/186 |

OTHER PUBLICATIONS

Dey A. K.: "Providing Architectural Support for Building Context-Aware Applications" Ph.d. Thesis, College of Computing, Georgia Institute of Technology, 'Online! Nov. 2000, pp. 1-170, XP002188154.

Crichton C., Davies J., Woodcock J.: "When to Trust Mobile Objects: Access Control in the Jini (TM) Software System" Proceedings of the International Conference on Technology of Object Oriented Languages & Systems, Paris, FR, Aug. 1, 1999, pp. 116-125, XP002155686.

Dey A.K.: "Understanding and Using Context" Personal and Ubiquitous Computing, Springer-Verlag, London, UK, 'Online! vol. 5, No. 1, Feb. 23, 2001, pp. 4-7, XP002188155.

Dey A.K., Abowd G. D.: "Cybreminder: A Context-Aware System for Supporting Reminders" Proceedings of the 2nd International Symposium on Handheld and Ubiquitous Computing (HUC2K), Bristole, UK, 'Online! Sep. 25-27, 2000, pp. 172-186, XP002188156.

Guttman E.: "Service Location Protocol: Automatic Discovery of IP Network Services" IEEE Internet Computing, IEEE Service Center, Piscataway, NJ, US, vol. 3, No. 4, Jul. 1, 1999, pp. 71-80, XP002140936.

"Jini (TM) Discovery and Join Specification, Revision 1.0" Sun Microsystems, Jan. 25, 1999, XP002154096.

* cited by examiner

*Primary Examiner*—Bunjob Jahoenchonwanit
*Assistant Examiner*—Julian Chang
(74) *Attorney, Agent, or Firm*—Oblon, Spivak, McClelland, Maier & Neustadt, P.C.

(57) ABSTRACT

A system for supplying context information on request includes a context attribute specifying a type, a format, and a focus entity for a data record representing a response to a request for context information, at least one context source providing context data relevant for the request of context information, and at least one context interpreter configured to establish an interconnection between the context attribute and the context source. The system also includes a configuration unit configured to keep track of availability and suitability of context sources and context interpreters and set-up a dynamic context graph configuration for assembling the context sources and the context interpreters based on the availability and suitability of the context sources and context interpreters to provide the data record.

24 Claims, 11 Drawing Sheets

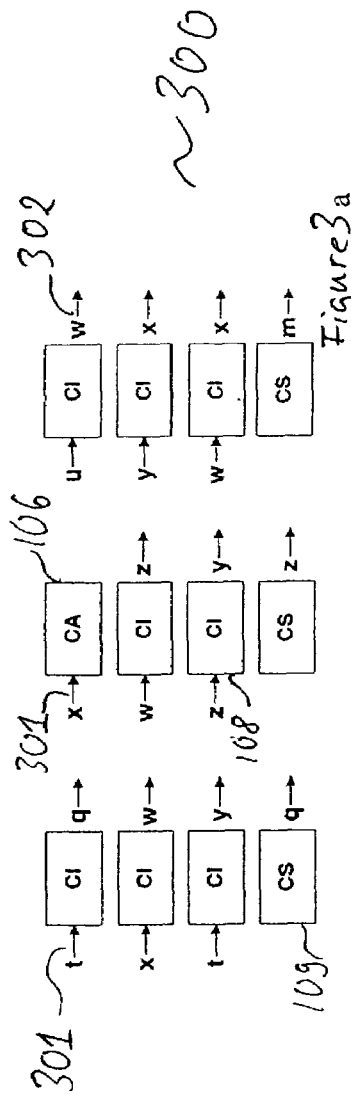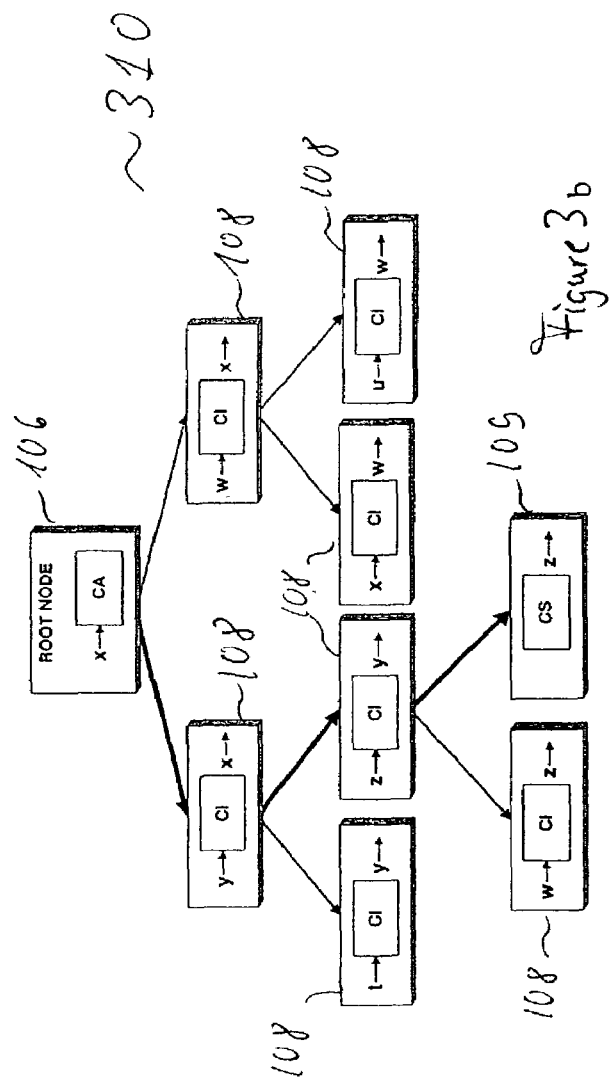
Figure 3a
Figure 3b

SYSTEM FOR AUTOMATICALLY CREATING A CONTEXT INFORMATION PROVIDING CONFIGURATION

BACKGROUND OF THE INVENTION

1. Field of Invention

The present invention relates to context-aware systems, in particular to context-aware systems employing sensors of varying availability.

2. Discussion of Background

Context-awareness is a key technology for the next generation of smart devices. These devices will not only know where they are, by whom they are used, and what other devices are around them, they will have a broad knowledge about what a user's desires and needs are and will act accordingly. To implement that, the devices will therefore need to utilise numerous internal and external sensors for collecting enough information to derive context information reliably.

Context, as it is used in this specification is defined by Anind Dey in "Understanding and using context", Personal and Ubiquitous computing, special issue on Situated Interaction and Ubiquitous Computing", Vol. 5(1), 2001, page 4-7, as any information that can be used to characterise the situation of an entity. An entity is a person, place, or object that is considered relevant to the interaction between a user and an application, including the user and applications themselves. The entity for which context information is collected is furthermore addressed as focus entity.

Knowledge about a context can be used in various ways to make applications and devices much smarter by automatically incorporating this context information. Unfortunately, context is rather complex and therefore hard to handle. The complexity results from the multiplicity of different types of context potentially derived from numerous different sensors. A tourist, e.g., moving around in a foreign city is supplied by his context-aware device with an active map and additionally with information about the sights he or she is currently viewing. In this case, the context-aware device will need—among others—information about the current location of the tourist. For the tourist being outdoors, this information can be obtained by using a Global Positioning System (GPS) but indoors, this is no longer feasible because accessing GPS satellites is impossible from within buildings. Consequently, special indoor location systems are to be used for retrieving the position information indoors. Whenever a user moves into or out of a building, his or her context-aware device has to switch to another location defining system. Handling this take-over from the outdoor to the indoor location defining system and vice a versa is currently performed on the application side, which works quite well when there are only a few possible sources of information available.

As soon as a large number of different sources have to be considered, this approach becomes impracticable. The tourist of the above example might for instance not only be interested in his own position, but also wants to know if certain persons move in or out of a certain area, e.g. if his children are going to far away. For this, a system has to utilise a large number of location sensors of different types—indoor as well as outdoor—whereby the indoor location type might also differ from building to building and therefore from person to person. The context-aware device will have to deal with this, and might have to implement the access to different types of location sensors at the same time. The configuration of a context-aware device will become even more complicated, if not only location information is used, but a wide range of different information sources like for temperature, pressure or the like to create a more complex context structure.

Anind Dey discloses a Context Toolkit developed at the Georgia Institute of Technology in "Providing Architectural Support for Building Context-Aware Applications", PhD theses, College of Computing, Georgia Institute of Technology, December 2000. The purpose of the context tool kit is to hide the process of gathering context information in the same way that X-window widgets hide the complexity of the X-windows system from an application developer. Widgets represent a certain kind of information like e.g. a location or an activity based on data provided by sensors. X-window widgets accumulate complex graphical user interface handling functionality into one component and are accessed via a uniform interface thereby hiding the details of an underlying sensor configuration. Context aggregators sum up a number of widgets to a more complex "meta-widget" providing access to more complex context information. Interpreters transform low-level context information like a location or an activity to a more abstract higher level information, like e.g. by deducing from the information that somebody is lying in a bed with a regular low pulse that this particular person is sleeping.

The Context Toolkit is the currently most popular context handling system. It is very easy to use and simplifies the implementation of context-aware applications by providing widgets and interpreters for frequently used context types. The Context Toolkit assumes that the sensor configurations are static, i.e. the application developer determines at design time which widgets, interpreters and aggregators are to be used. Because no reconfiguration of the system is supported, the inflexible structure yields the problem, that if a sensor fails the error is propagated up to the application level.

The European funded Youngster project (IST-2000-25034) develops technologies to create a new open active mobile multimedia environment that is accessible from anywhere by a wide range of devices and networks, and that supports context-aware features including location-awareness.

Within the project, a context system for a mobile platform is evaluated, proposing in principle that all requests from context clients, i.e. context-aware devices are passed to a local context service. This service tries to resolve the requests locally by either providing shortcuts to local context sources or by reusing existing connections to context servers. If a request cannot be resolved locally, it is passed to a remote context server for further processing. Context service and context server may reside on the same host. Context sources have direct access to sensors and transform the sensor data into a format that is understood by the context server. Context sources might also be located within the server accessing the sensors only remotely.

The term context client refers to an entity requesting context information, while the term context server refers to an entity providing context information. Context clients request context information from a context server by specifying the desired information, like e.g. location. The mapping of the desired information type to the available sensors is done via the context server.

A context server creates paths from a requested data type to the available sensors. If a request cannot be mapped directly to respective sensors, a data transformation via so called context interpreters is performed.

With the paths created, a context information originates from a sensor and is afterwards translated by a context source from a proprietary format into a Youngster internal format that is understood by appropriate context interpreters. The context interpreters themselves process data and are composed within a chain. In the end of the chain, data in the originally requested format are stored in a context attribute which itself is part of a bigger data structure, the aggregator. The context attribute specifies the format, the type and through the parent context aggregator also the focus entity of the stored data.

In the context system for mobile service platforms as proposed in the Youngster project, clients do not need to have knowledge about available sensors or how to put them to use, but can transfer this task completely to the context system. The mapping from the desired type and format for the requested context information to the available sensors is done by the server by automatically creating a so-called context path. The path can be implemented in form of a linear path or a more complex structure with sensor hierarchies utilising basic and abstract sensors. Abstract sensors collect data from different basic sensors and transform the data to a certain degree. The configuration of the context path shows a tree structure with the root node being a context attribute that can be accessed from a context client.

The path from a requested data type to the available sensors has to be set up manually, which means that e.g. for all desired types and formats of context attributes a chain of context interpreters and sources has to be created and connected manually. Another possibility is to have the context clients specify what context interpreters and context attributes to use and how to connect them according to rules defined by the client. Although the advantages of an automatic and on-demand creation of a context path, like keeping the constructions of context clients simple, providing flexibility both on the client as well as on the server side, and an ease of maintenance are very obvious, no mechanism for automatically creating a context path is presently available.

SUMMARY OF THE INVENTION

It is therefore an object of the present invention to provide a system and a software product to automatically provide a path from a request of context information to available sources providing such information.

This object is achieved by a system and a software product and a method as claimed in the respective main claims.

In particular, the above mentioned object is achieved by a system providing context information on request with a context attribute specifying a type, a format, and a focus entity for a data record representing a response to a request for context information, at least one context source providing context data relevant for the request of context information, at least one context interpreter for establishing an interconnection between the context attribute and the context source, and a configuration means for setting up a dynamic context graph configuration for assembling context sources and context interpreters based on the actual availability and suitability to provide the data record.

Further, the above object is achieved by a software product adapted to implement a system providing context information on request according to the invention on a data handling device when being executed by a processing means of the data handling device.

The above object is further achieved by a method for providing context information on request with steps for specifying a type, a format, and a focus entity for a data record representing a response to a request for context information, for locating one or more context sources providing context data relevant for the request of context information, for locating one or more context interpreters for processing the provided context data related to the focus entity into the specified type and format for the data record, and for setting-up a dynamic context graph configuration for assembling context sources and context interpreters based on their actual availability and suitability to provide the data record.

The proposed system for providing context information on request allows an on-demand creation of a context path for reliably supplying a context client or a context-aware device, respectively, with the requested information. The present invention further allows to keep the structure of context-aware devices or context clients very simple, especially when compared to systems, where a client has to take care of the sensor configuration itself. Since no predefined parts for the set up of the context path are needed, a high flexibility both on the client and the server side is achieved. A desired functionality is created on demand. By dynamically adapting the context path to changes in the availability and suitability of elements used in that path, the maintenance effort for the system is considerably reduced.

Further advantageous features are claimed in the respective sub-claims.

Advantageously, the configuration means generates the context graph configuration by connecting to the context attribute a first context interpreter with an output connector matching the input connector of the context attribute or a context source with an output connector matching the input connector of the context attribute, connecting, upon usage of a first context interpreter each of the input connectors of the first context interpreter to an output of a context interpreter matching the respective input connector or to a context source with an output connector matching the respective input connector, connecting each of the input connectors of a context source not yet connected to an output connector of a context source or to an output connector of a context interpreter to an output of a context interpreter matching the respective input connector or to a context source with an output connector matching the respective input connector. This means, that a context path is constructed beginning from the input connector of the context attribute via context interpreters to one or more context sources, whereby each context interpreter placed between the context attribute and the context source transforms at least part of the data forming the context information into a type and format understood by the proximate context interpreter closer to the context attribute, and finally by the context attribute itself.

It has to be clarified at this point, that for the case of an output connector of a context source matching the input connector of a context attribute, that context source can be directly connected to that context attribute. But generally, many contact sources will be required to provide the requested information, so that data provided from a plurality of contact sources will have to be processed by a plurality of context interpreters for being transformed into the respective type and format specified by the context attribute.

Further advantageously, a feedback function is created by connecting an input connector of a context interpreter to an output connector of a different context interpreter already connected to an input connector of a further context interpreter or to an input of a context attribute present in the context graph configuration. Feedback functions are especially useful with data processing requirements employing intermediary results from different processing stages.

Preferably, a condition for creating the feedback function is specified by a constraint defined for the context interpreter, and an implementation of the feedback function is specified by a corresponding constraint-event defined for the context interpreter, thereby allowing an easy handling and implementation of feedback functions in a context graph configuration.

A repository containing a plurality of available context interpreters and context sources favourably provides context interpreters and context sources to the configuration means for a simple acquisition of the elements used with a context graph creation.

Advantageously, context sources access sensors providing physically data and/or information data and further advantageously the context graph configuration is advantageously set-up in compliance to predefined optimisation rules. A graph-cache provides in a preferred embodiment of the present invention pre-configured context graph configurations for use by the configuration means so that a context graph can be set-up in short time.

To obtain a high flexibility in the context graph creation, the focus identity defined for an input connector and/or output connector of a context interpreter or a context source provided for being used within a context graph is preferably implemented as a variable to be bound to a real value upon initialisation of the context graph. To provide even more flexibility in the adaptation of a context graph to changes in its environment, a context interpreter advantageously modifies the type of its input connector and/or the type of its output connector according to changes in the availability or characteristic of data requested and/or received.

In another preferred embodiment of the present invention, a configuration means comprises a context graph creation means for automatically assembling a context graph for a given context attribute and/or a change management means for controlling a reconfiguration of a context graph upon changes in the availability and/or suitability of an element within the context graph.

Further, the configuration means advantageously comprises a context graph optimisation means for controlling the set-up of a context graph according to a system of rules. This allows to influence the way data for the required information are acquired and processed. To ensure the operability of a created context graph, the configuration means may advantageously comprise a context graph validation means for verifying the consistency of a context graph and the availability of the components used within a context graph. The configuration means further preferably comprises a context graph set-up means for instantiating the context interpreters and context sources in a context graph to build a fully functional context graph from a context graph class.

Advantageously, the configuration means comprises a pre-selection means for selecting context sources and context interpreters suited for creating a context graph for a given context attribute and/or a sensor pre-selection means for selecting sensors to be used with context sources suited for creating a context graph for a given context attribute to further speed up the creation of a context graph.

The availability and suitability of each context source and/or each context interpreter is advantageously monitored constantly.

Further, the configuration means preferably comprises a sensor management means for monitoring the status in availability of each sensor used for a context graph and forwarding the result to the change management means, thereby allowing an online adaptation of the context graph to changing conditions.

According to an advantageous development, if a context source and/or a context interpreter is detected to fail by no longer being available and/or being unsuited to provide or process context data, the part of the context graph configuration constituted by the failed context source or context interpreter and context sources and/or context interpreters connected to its input connector is invalidated and reconstructed.

To avoid misuse of information data and to enforce privacy of data, the configuration means preferably comprises an access control means for enforcing access restrictions imposed on the usage of a component in the context graph.

For billing purposes, the configuration means may be further implemented with an accounting means for charging a focus entity for a usage of sensors and elements used for a context graph. According to an advantageous development at least one pre-defined context graph is linked to the context graph being set-up, thus allowing more dynamic sensor configurations.

The proposed system and software can for example be implemented in a context server for creating flexible and dynamic context graphs for a context information request. The mechanism of the graph creation according to the present invention can further directly be adapted to the field of service aggregation to combine relatively simple atomic services to more complex aggregated ones.

Also network monitoring makes use of a special context information about a network; therefore the context information providing system according to the present invention can also be used to further automate the process of collecting information and evaluation in that field. Based on a number of given operators for basic network status information e.g., a complex information describing the network status more completely can be derived. Another field of application is that of format adaptation. There are already some systems that allow an instant transformation of documents from one format to another one. Normally, dynamically created path are used to translate a source format to a desired destination format. The graph creation technique according to the present invention can thus be used to further enhance those systems by implementing conversion steps where multiple files are created at the same time and are merged at a later time. This allows far more powerful format conversion mechanisms than those presently available.

Because a context information providing system according to the present invention generally specialises on information handling, the invention can therefore be easily used whenever information evaluation logic has to be set-up automatically.

BRIEF DESCRIPTION OF THE DRAWINGS

In the following description, the present invention is explained in more detail with respect to special embodiments and in relation to the enclosed drawings, in which FIG. 1 schematically shows a prior art system for providing context information.

DESCRIPTION OF THE PREFERRED EMBODIMENTS

Figure 1:
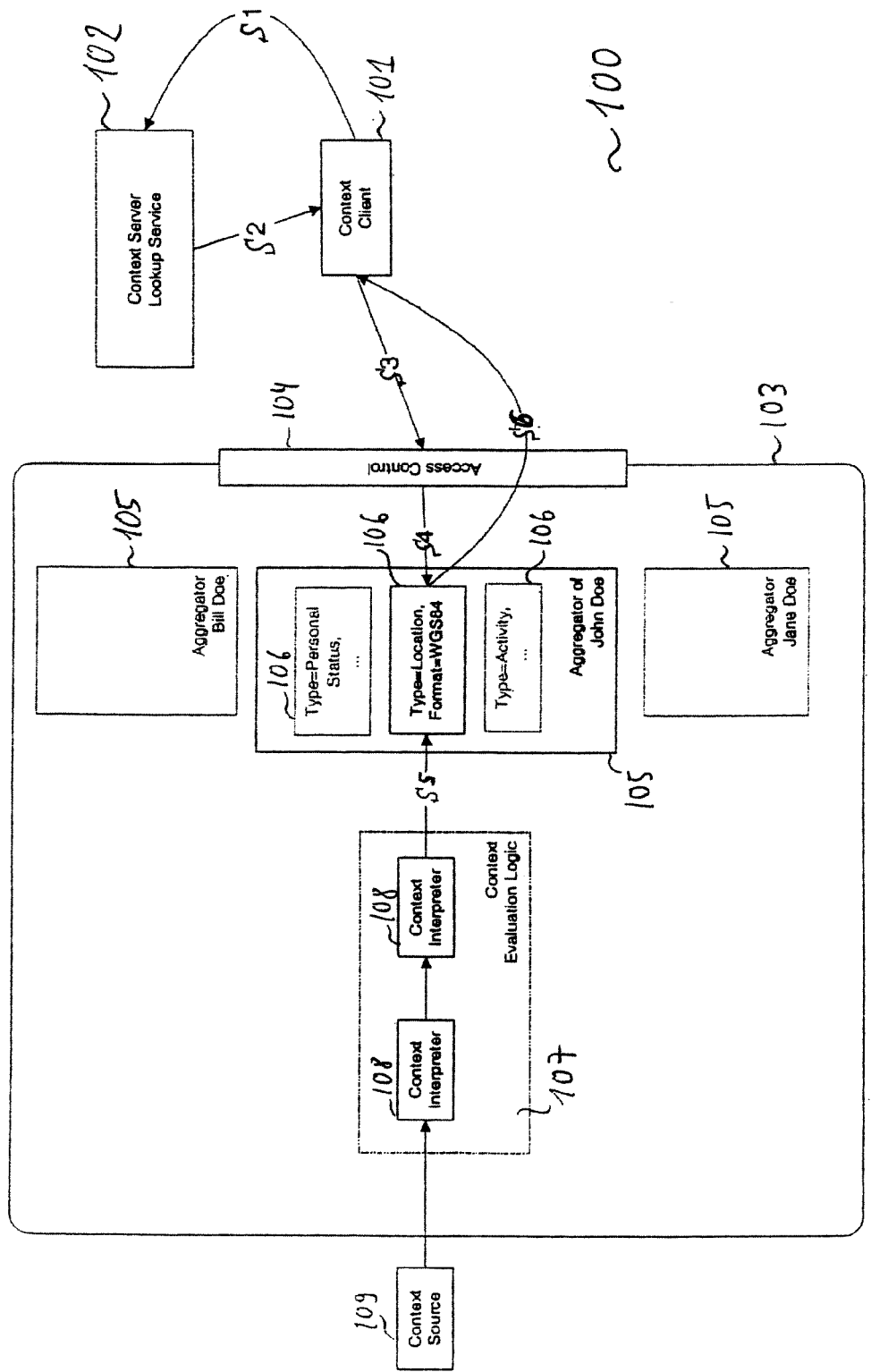

The block diagram of FIG. 1 illustrates a context serving method and the principle components and their interactions of a context serving system 100 as it is implemented in the Youngster project described above. In principle, a context line requests a certain context information like for e.g. a location determination, related to a focus entity like e.g. a person named "John Doe" in a certain format like e.g. WGS 84. The context client 101 queries in step S1 the context server look-up service 102 for a context server 103 able to provide the requested information. The context server look-up service 102 sends a response in step S2 with context information for an appropriate context server 103. With this information, the context client 101 directs an initial request to the context server 103 in step S3. An access control 104 checks if the context client 101 is authorised to get the requested information and on deciding positively, sets up a connection in step S4 to an appropriate context attribute 106 of a context aggregator 105 related to the respective focus entity, in the given example "John Doe". The context attribute is fed by an evaluation logic 107 that is designed to retrieve information from context sources and mediated by these from sensors, and to transform the retrieved information to the proper type and format in step S5. Finally, in step S6 the requested context information is passed from the context attribute 106 back to the context client 101. The evaluation logic 107 needed for step S5 is set up manually, which means that for all desired types and formats of context attributes 106 a chain of context interpreters 108 and context sources 109 has to be created and connected manually. Another possibility provided by the state of the art is to have the context client 101 specify which context interpreters 108 and context attributes to use and how to connect them according to rules defined by the context client 101.

Figure 2A:
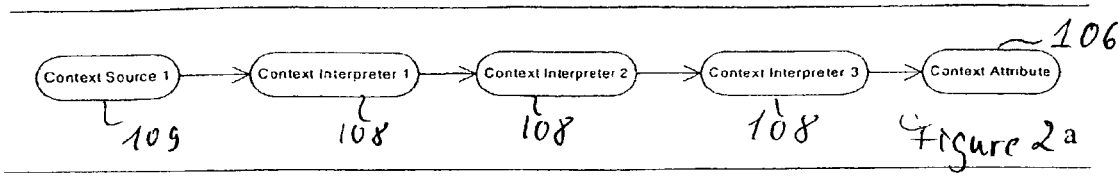
FIG. 2*a* shows an example of a linear context path.
Figure 2B:
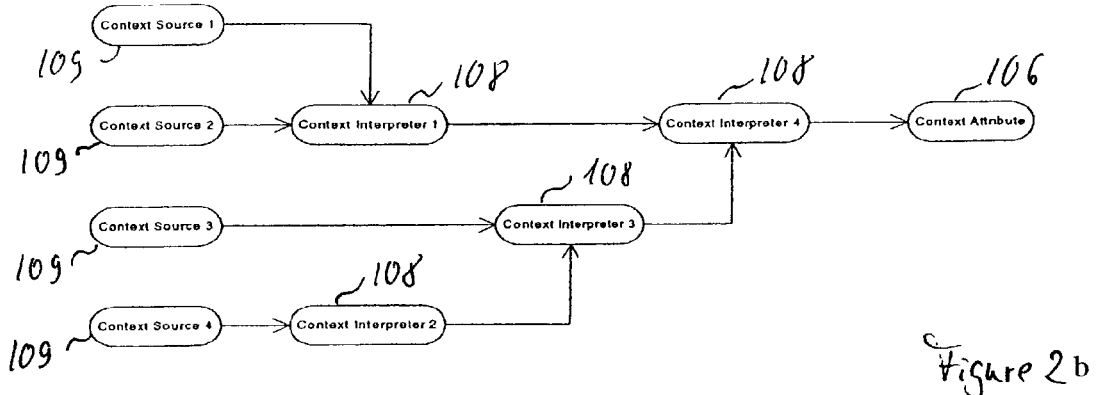
FIG. 2*b* shows an example of a context path with a tree structure.

Examples for context paths according to the prior art are given in FIG. 2a and FIG. 2b. A linear context path like the one shown in FIG. 2a connects a context source 109 to a context attribute 106 by a chain of context interpreters 108, whereby every context interpreter 108 comprises exactly one input connector and one output connector so that the linear configuration of the context paths is achieved. This concept of FIG. 2a allows only one context source 109 to be employed for a context attribute 106.

A usage of one or more context interpreters 108 with more than one input connector allows to edit context data provided by more than one context source 109 for creating a data record specified by a context attribute 106 representing the response to the request for context information by a context client 101. The context interpreters 108 hereby transform the context data from the different context sources 109 through different processing stages in a tree structure of a context path like that shown in FIG. 2b.

Figure 2C:
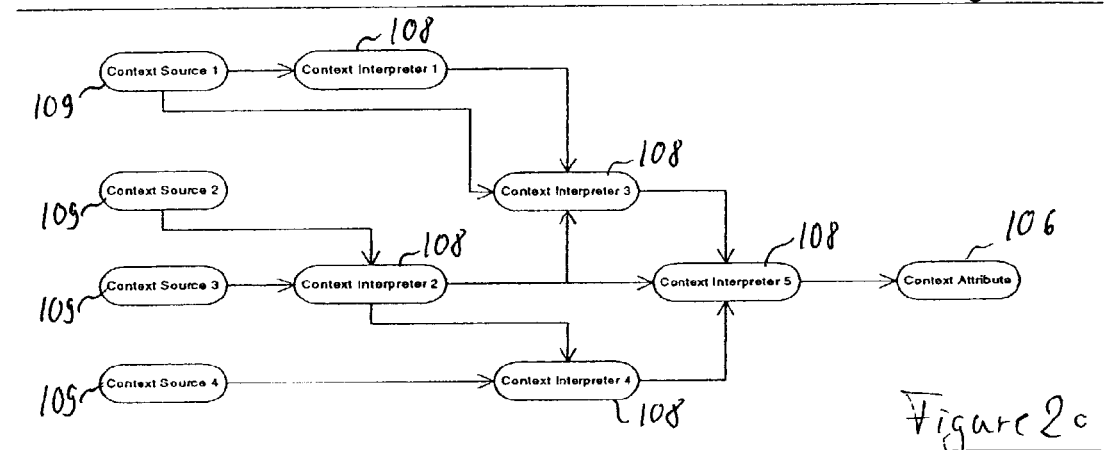
FIG. 2*c* shows an example of a context path with a context graph structure according to the present invention.

When allowing different sensors or context sources 109, respectively, and context interpreters 108 to supply data to a number of other context interpreters 108 at the same time, the resulting composition results in a graph structure like that of FIG. 2c. In the following, a context path having a graph structure will be referred to as a context graph.

Figure 2D:
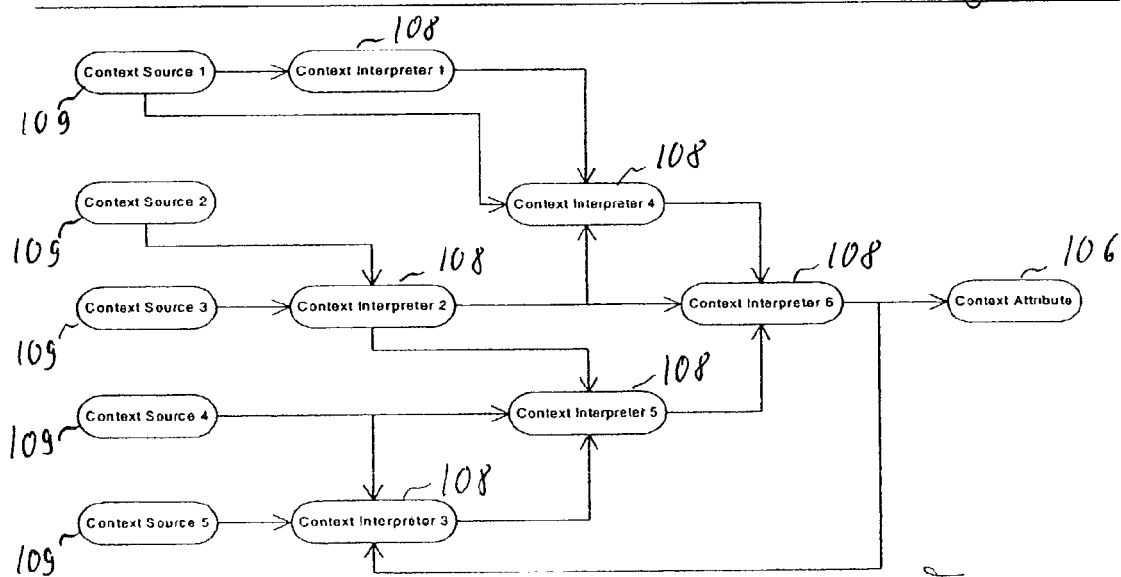
FIG. 2*d* shows the context graph structure of FIG. 2*c* enhanced with feedback functionality.

As distinguished from a tree structure like the one in FIG. 2b, wherein the elements of the context path, i.e. the contest sources 109 and the context interpreters 108, are arranged hierarchically in different branches of a tree, a context graph breaks through the hierarchy by allowing interconnections between elements within one branch and between elements of different branches. FIG. 2d shows an example of a full featured context graph according to the present invention comprising feedback functions like the one implemented by the interconnection between context interpreter number 6 and context interpreter number 3. Feedback functions provide increased complexity. Nevertheless, upon creation of the context graph, they can be easily handled without any limitation.

A context graph creation basically starts from a context attribute. The context attribute 106 specifies the type, the format, and the focus entity of a requested context information. Each context attribute 106 has an interface through which the defined data record can be received by it. This interface is called input connector. Data can only be provided to this input connector by another element of the context graph having an interface for delivering data of exactly the specified type for the data record. An interface for delivering data is called an output connector. The data type specified for an interface also specifies the type of the interface itself. A connection between different elements of a context graph is set up by connecting an input connector of a certain type of one element to an output connector of the same type of a different element in the context graph.

The basic method and technique underlying an automatic set-up of a context graph creation according to the present invention is illustrated in FIG. 3. To provide a straightforward exemplification of the context graph creation process, in the example of FIG. 3 only context interpreters having one input and one output connector only are used. Even though only a linear context path can be created with this example, the technique described herewith is identical to the basic technique for creating a more complex context graph as described later in the specification.

In FIG. 3a the context attribute 106 and the elements available for context graph creation, more precisely the available context interpreters 108 and context sources 109 are shown. The context attribute 106 has an input connector type x. Three different context sources are available each one having a different type of output connector. The type of the input and output connectors are identified by letters. An input connector only matches to an output connector when both are of the same kind; in the example of FIG. 3a this means, that the letter identifying the type of the connector is identical for the respective input and output connectors. The context interpreters of FIG. 3a show different combinations of input and output connectors.

To create a context graph, a search tree is set up first. The context attribute 106 forms the root node of the search tree 310. The list 300 of FIG. 3a is searched for elements with an output connector matching the input connector of the context attribute. These elements are used for the first level of the search tree 310. In the example of FIG. 3b two context interpreters fulfil the condition of having an output connector of type x, the left one having an input connector of type y the right one having an input connector of type w. Next, elements with an output connector of type y are taken from the list 300 and added in the next level of the search tree 310 to the branch below the context interpreter with an input connector of type y. Elements with an output connector of type w are added to the branch of the context interpreter with an input connector of type w. The process is continued until a context source can be added to this search tree. Finally, a path from the context attribute 106 via the context interpreters along the connections of the search tree 310 to the context source 109 is created to form a context graph. Bold arrows indicate the created linear context path in FIG. 3b. The context path is used to supply the context attribute 106 with a data record of the specified type, format, and focus identity based on context data provided by the context source 109, and transformed by a sequence of context interpreters 108 to the format and type understood by the context attribute.

It is to be noted, that there is a major difference between a search tree and a context graph. The first one is used to structure the search space for a path creation, the second is a structure used to describe the relationships between the context attribute, the context interpreters, the context sources and mediated by the context sources also the sensors.

Figure 3C:
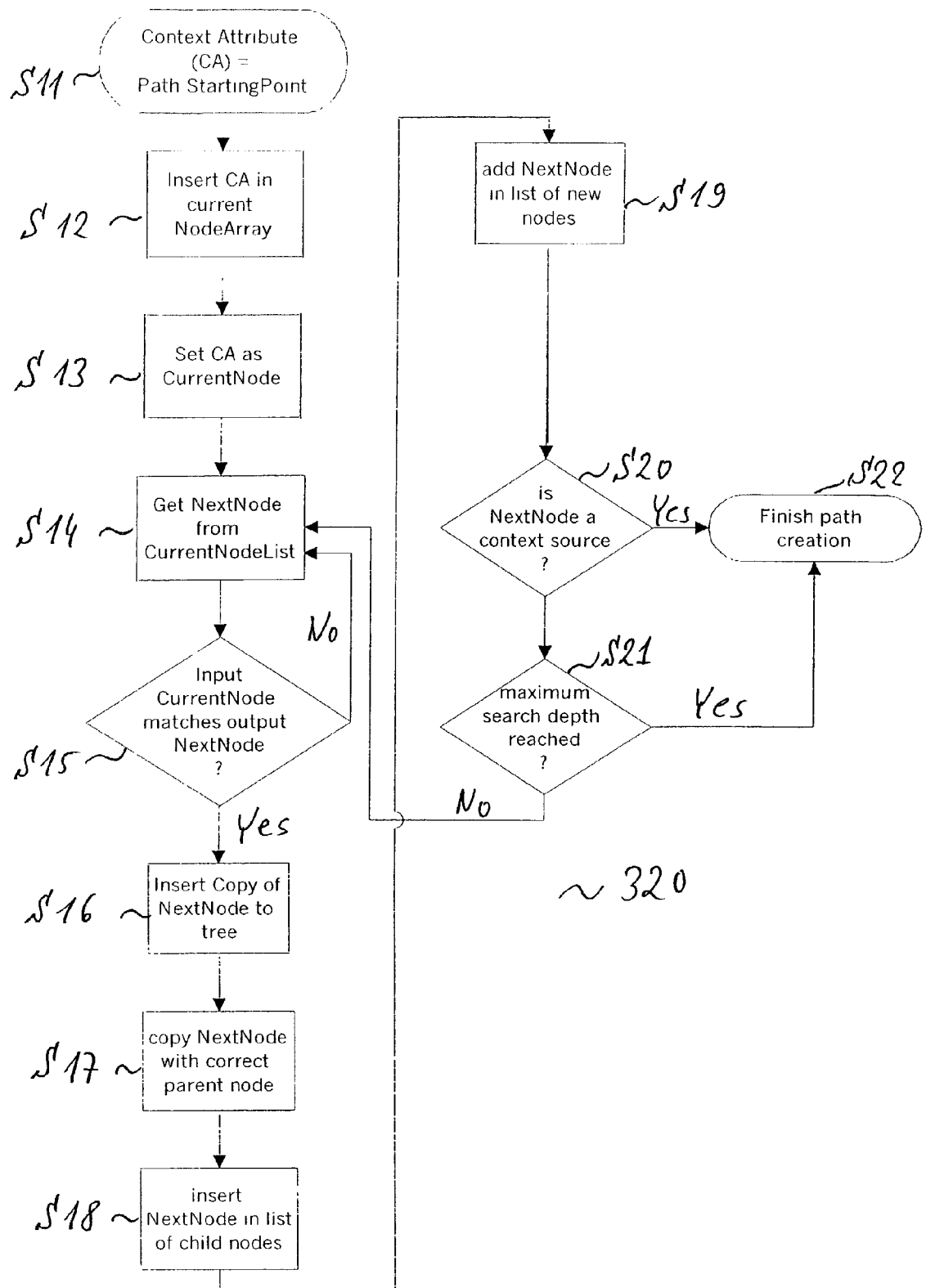
FIG. 3 shows the creation of a search tree for assembling a linear context path.

The flow diagram of FIG. 3c illustrates the process steps for creating a search tree for a linear context path like that shown in FIG. 3b. In step S11 a context attribute is used as a starting point for the path creation. This context attribute is inserted into a current node array in step S12 and set as the current node in-step S13. Next, in step S14 the next node is taken from the current node list. In step S15 it is checked if the input connector matches the output connector of the current node, which at this first stage of the search tree creation is the context attribute. In a later stage, the current node is one of the context interpreters already added to the tree structure previously. If the output of the next node does not match the input connector of the current node, the search returns to step S14 to get the next following node from the current node list. If the connectors of the current node and the next node match in step S15, a copy of the next node is added to the tree and also to the list of new nodes S19, whereby copies have been made of the next node with the correct parent node in step S17 and the correct child node in step S18 to define the relationships. If the new node is found out to be a context source in step S20, the tree creation is finished and the path can be assembled in step S22. If the new node is not a context source, it is checked if the maximum search step is already reached whereby an error is created and the tree creation finished in step S22. As long as the maximum search depth defining the permissible number of levels for a search tree is not reached in step S21, a next node is again taken from the current node list in step S14, and steps S15 to S21 are repeated until the tree creation can be finished in step S22 either successfully or with an error.

The basic concept of creating a context graph according to the present invention is shown in the graphical representations of FIG. 4a to FIG. 4d. A context graph creation method as described in the following, uses for the sake of a concise illustration a context attribute with only one input connector. But it has to be noted, that a graph creation according to the present invention is not restricted to context attributes with only one input connector, but that the method described in this specification can also be applied to a second or even to further input connectors of a respective context attribute.

Figure 4:
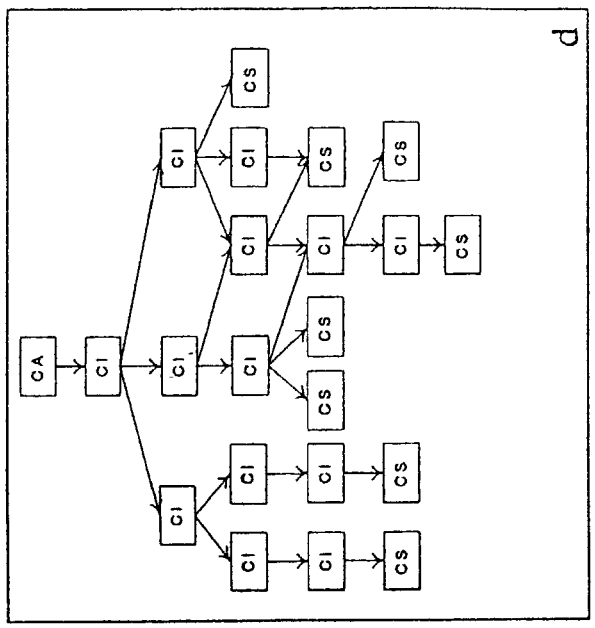
FIG. 4 shows the different steps employed at different stages of the creation of a context graph according to the present invention.
Figure 4:
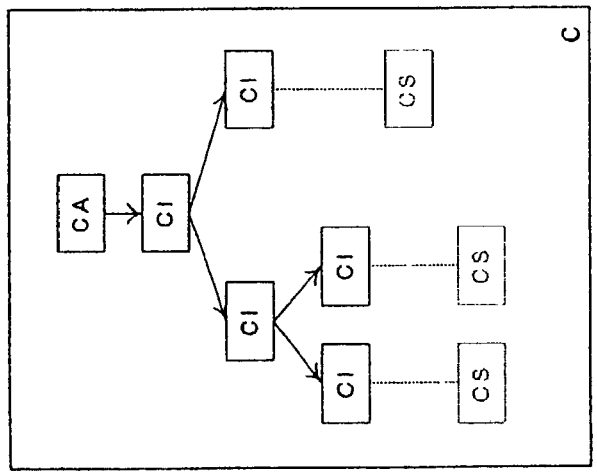
Figure 4:
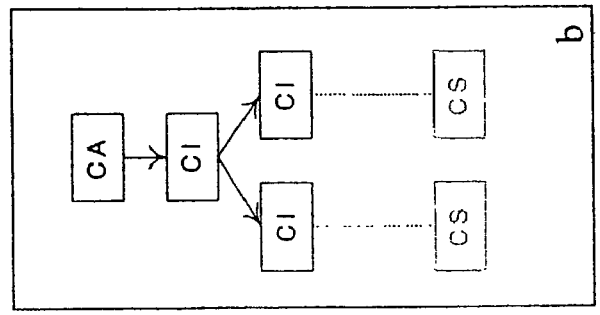
Figure 4:
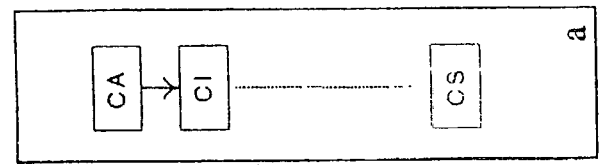

The context graph creation starts by trying to assemble a linear context path from the context attribute 106 to a context source 109 as shown in FIG. 4a. For this purpose a context interpreter 108 with one input and one output connector is attached to the context attribute. If necessary, a further context interpreter 108 with one input connector and one output connector is attached to this context interpreter 108 and so on, until a linear interconnection from the context attribute 106 to the context source 109 via the chain of context interpreters 108 is set up.

If this linear path creation fails, usually because there are no appropriate context interpreters and/or context sources available, the first context interpreter 108 in the described chain of context interpreters is exchanged for a context interpreter 401 with two input connectors. The rest of the context interpreters 108 connected to the input connector of the first context interpreter 108 in the chain of FIG. 4a are omitted.

Figure 5:
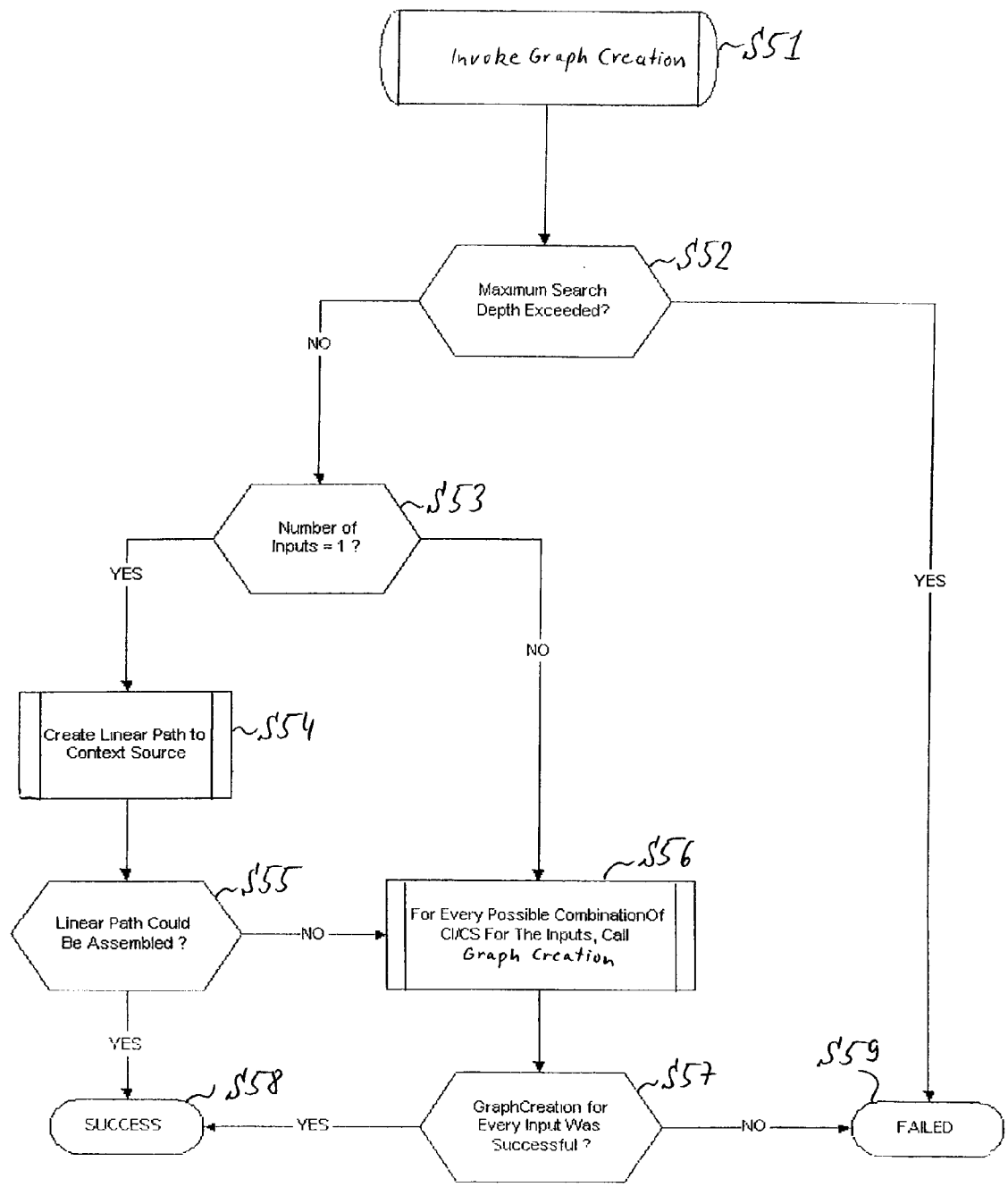
FIG. 5 is a flow chart diagram showing the process steps for a context graph according to the present invention.

Next, for every input connector of the context interpreter 401 it is tried to create a linear path to an appropriate context source 109 as shown in FIG. 4b. Again, if the linear path creation fails for one of the two sibling input connectors, the context interpreter 108 connected to said sibling is exchanged by another context interpreter 401 with two input connectors as illustrated in FIG. 4c for the left sibling of the input connectors. Each time a creation of a linear path fails for a sibling output connector of a context interpreter 401, the first context interpreter 108 connected to the respective sibling output connector is replaced by a context interpreter 401 with two input connectors until a context source 109 is connected to the end of a path line. A context interpreter and/or a context source can be used in different branches of the configuration simultaneously whereby the structure then finally results in a graph as shown in FIG. 4d. The basic steps for the creation of a context graph according to FIG. 4d are shown in the flow diagram of FIG. 5. Graph creation is invoked in step S51. To avoid an endless creation of a context path, a maximum is set for the depth to which the graph can be developed. This value is checked in step S52, and if the maximum depth is reached, graph creation is stopped with an error message in step S59. As long as the maximum depth is not exceeded, it is checked in step S53, if the current context source has exactly one input connector. If so, it is tried to create a linear path to a context source in step S54, according to the method described above. In step S55 it is checked if the linear path creation was successful and if so, the graph creation is finished. If not, the hereby described graph creation process is applied recursively for the inputs of every possible combination of context interpreters and context sources in step S56. In step S57 it is checked, if the graph creation was successful for every input connector and the graph creation is finished for a positive result successfully in step S58 or for a negative result with an error message in step S59.

In principle, for a context graph creation, it is first tried to assemble a linear path and if that fails, a sub tree is spawn. This is repeated recursively for all nodes (context interpreters) added to the graph so far. The search depth is limited since the complexity increases with the number of elements and the maximum depth of the context graph.

In a graph creation as described until now, no feedback functions can be handled. To implement feedback functions, constraints and constraint-events for every element used in the context graph are defined. A context graph element with a defined constraint can only be used when the circumstances given allow doing so. Whenever a constraint can be fulfilled, a function associated with the corresponding of constraint-event is executed. A constraint defines a certain condition for the usage of a context interpreter or a context source within a context graph. A constraint-event defines a certain operation to be carried out when the condition defined by the constraint is valid. For example, a constraint might look like "only use this context interpreter if a context interpreter of type x is already used within the context graph", and the corresponding constraint-event will look like "connect me to x".

The handling and execution of this mechanism can be integrated into the above described context graph creation without any limitation. The constraints can further be used in other ways like e.g. that a constraint can only be deployed if there is enough computing power or when certain sensors are available. It is to be noted, that constraints cannot only be defined for context interpreters but also for context sources and for sensors.

Figure 6:
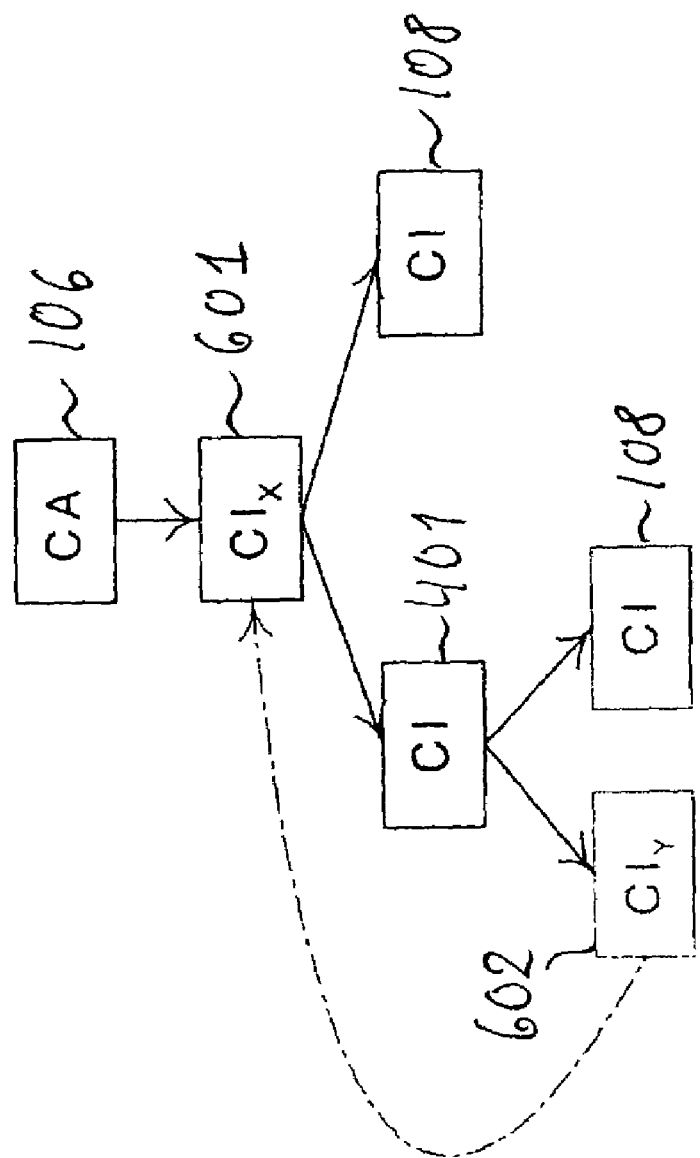
FIG. 6 shows the creation of a feedback function.

FIG. 6 gives an example on how feedback functions are handled by constraints. A context interpreter of type y, i.e. a context interpreter with the constraint to be connected to a context interpreter 601 of type x must be deployed. This constraint is satisfied in the example of FIG. 6 and therefore a respective context interpreter 602 of type y can be used. The constraint event is then used to actually implement the feedback function, i.e. connecting context interpreter 602 of type y to context interpreter 601 of type x.

The described context graph creation mechanism can be optimised further to increase its performance. First, the elements used by the context graph creation are sorted according to internal optimisation rules. Less often used elements are e.g. moved to the end of the list 300 of available elements, or elements with less input connectors are put to the beginning of the list. This increases the probability to use one of the preferred elements since the mechanism simply runs through the list from the first to the last elements. Alternatively, already used context interpreters or context sources can e.g. be moved to the beginning of the list 300, thus providing less redundancy in the number of different elements used.

As a further optimisation of the graph creation, not only one context graph is created for a given context attribute 106, but a variety of different context graphs. Each graph is then checked according to optimisation criteria like e.g. the minimum number of leafs, the lowest memory usage or the like, and the one showing the best results according to the optimisation criteria is then used with the given context attribute. Further, instead of going through the list 300 from the beginning to the end for searching the following context interpreter or context source, optimisation criteria can also be used for selecting the further context interpreter or context source during the graph creation. Often used context graphs can further be kept in a context graph cache for look up hereby increasing the performance, especially when a comparatively small number of different graphs is often deployed. Also sub-graphs can be stored in the cache which means that not only complete graphs are cached but also very often used parts of them. To increase the overall performance of the system, graphs can be pre-computed while the system has low load.

To simplify matters, until this point no distinction between a class and an instance of an element used in the context graph is made. The described context graph creation simply uses the characteristics of some of the elements and creates a structure representing the relationships among them. Nevertheless, a context graph will also have to be instanciated; i.e. instances of the element classes will have to be created and to be interlinked to build a fully functional context graph. Therefore, an additional step after the context graph creation, the context graph set up is necessary. In this step, instances of the necessary elements of the context graph are created. Wherever possible, already existing and running instances are used. Finally, all instances are connected with each other thus building the complete and fully functional context graph.

Figure 7:
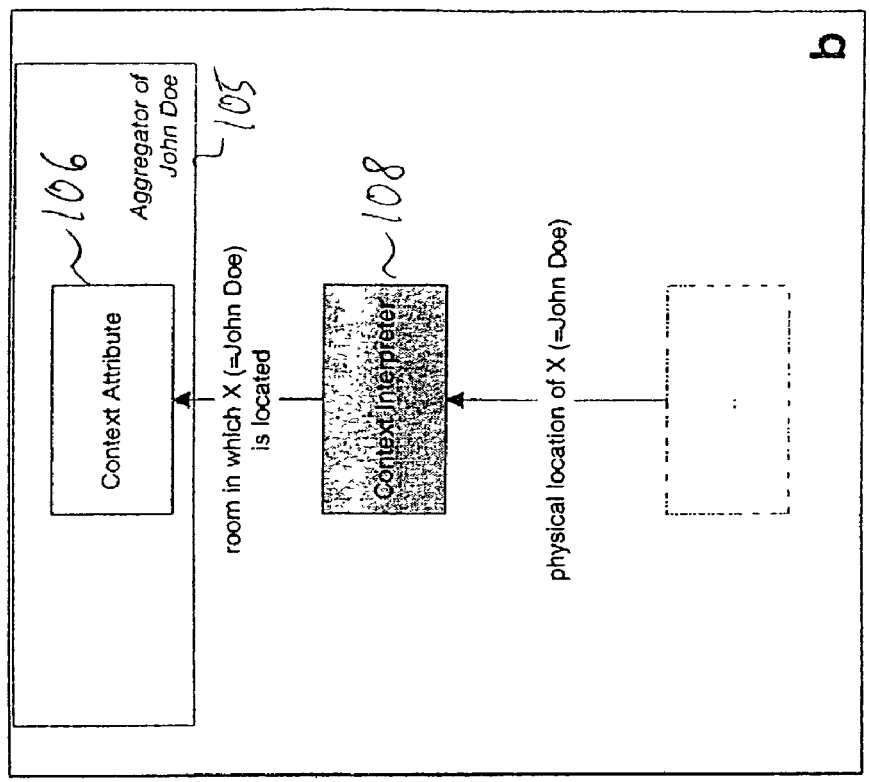
FIG. 7 shows the value binding within a context graph.
Figure 7:
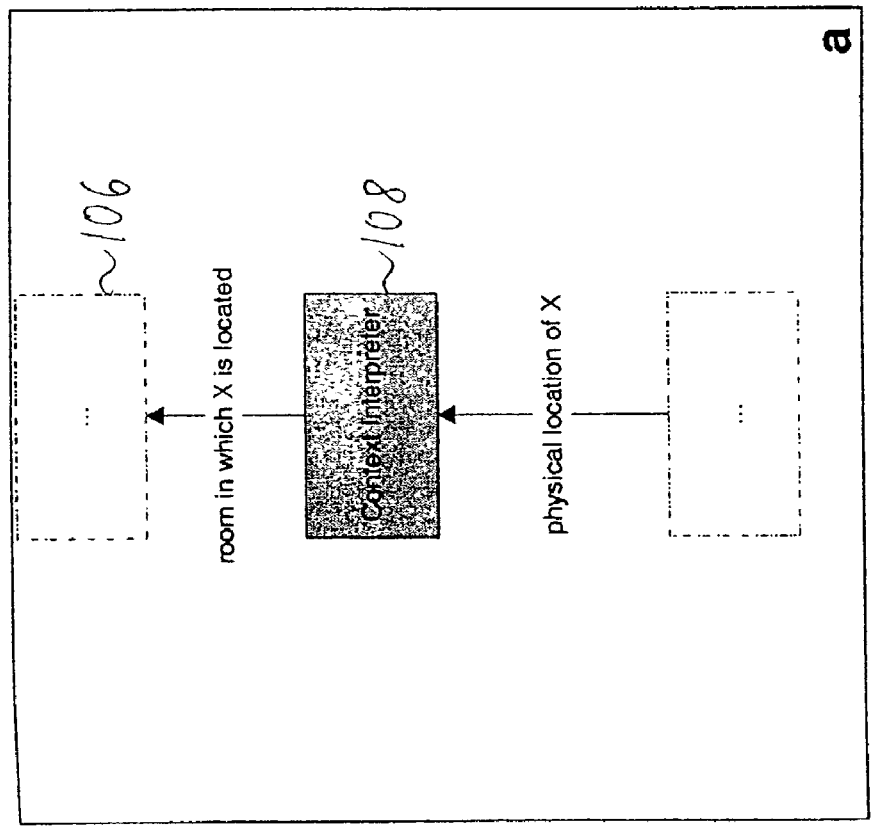

When context interpreters and context sources are selected to form the elements of a context graph, it has to be checked if the input and output values of the elements can be mapped to one another. As long as the focus entity is not specified, the input and output values of the elements of a context graph are not defined completely. FIG. 7a shows a context interpreter 108 that derives the room number of a person X by taking his physical location into account. As long as the context interpreter 108 is not used, the value of X is not specified and has to be bound to the appropriate value upon graph initialisation to define a valid relation among the context interpreters. If e.g. the context interpreter 108 in FIG. 7a is attached to the context attribute 106 that relates to the focus >entity "John Doe" this value has to be mapped to the variable "X". This is shown in FIG. 7b.

The binding of the virtual value of X to the real value within the context graph is done via standard unification schemes. In the above example the context interpreter 108 can be described by the input and output value in the form of a clause:

$$\{output\_room(X)^\frown input\_location(X)\}_{CI}$$

When the context interpreter 108 is attached to the context attribute, the clause of the context attribute has to be unified with the clause of the context interpreter, i.e. the bound (and possibly the unbound values) have to be checked for compatibility and the variables are bound wherever possible. Therefore $$\{input\_room(X)|_{X="John\ Doe"}\}_{CI}; \{output\_room(X)^\frown input\_room(X)\}_{CI}$$

results into $$\{input\_room(X)|_{X="John\ Doe"}\}_{CI}; \{output\_room(X)|_{X="John\ Doe"}^\frown input\_room(X)|_{X="John\ Doe"}\}_{CI}$$

by binding X to "John Doe" in all occurrences of X. If the unification is not possible with two clauses, two components are not compatible. Furthermore, if there are any unbound variables left at the end of the context graph creation, the resulting context graph is not valid and a new context graph creation has to be initialised. It has to be clarified that the focus entity is just one of the possible values of an input and output connector that has to be bound. During the context graph creation values that might be bound can be either types, formats or focus entities, depending on the characteristics of the context attribute, the context interpreters and the context sources.

Figure 8:
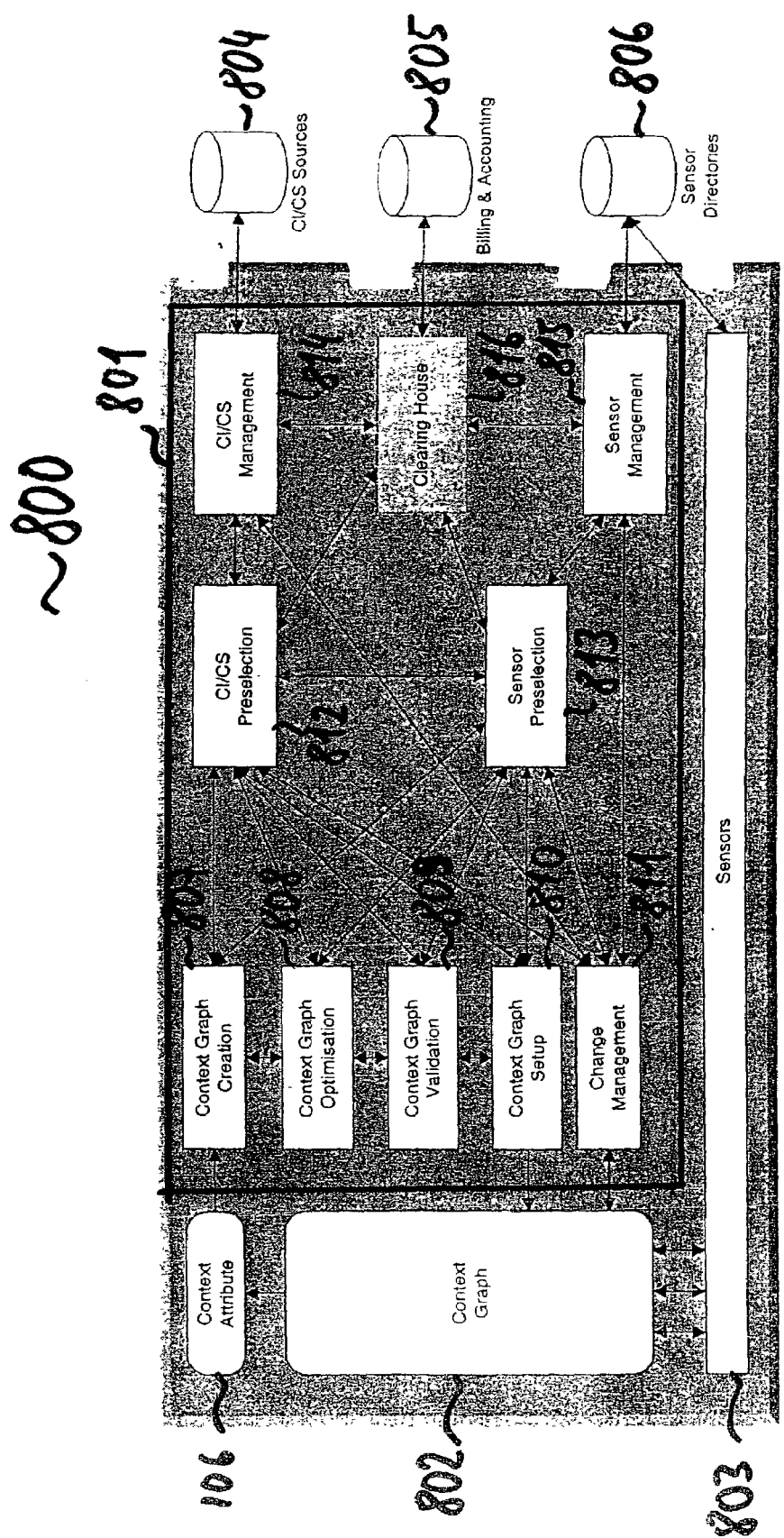
FIG. 8 shows the architecture of the context graph creation system.

FIG. 8 shows a context information providing system 800 according to the present invention. The dynamic set up of context graphs 802 is done by the configuration means 801 which in itself is build-up from several components.

The configuration means 801 takes the specification for a data record representing the response to a request for context information defined by a context attribute as a basis for the creation of a context graph. It returns a context graph which is connected to the context attribute, and is on the side of the context sources connected to sensors for providing the necessary context data. The configuration means is connected to a repository for context interpreters and context sources 804, in a special embodiment of the present invention further to a billing and accounting means 805 and in yet another embodiment of the present invention also to sensor directories 806.

The configuration means 801 is integrated in a context server 103 providing a context client with context information requested by the client. The context graph creation means 807 passes information about the focus entity to the CI/CS pre-selection means 812 and the sensor pre-selection means 813 where usage constraints are checked to determine which components can be used. The context graph creation means 807 then tries to assemble a context graph based on the provided context interpreters, context sources, and sensors. The configuration means 801 is responsible within the context client for an impromptu set-up of a dynamic context graph configuration that provides a context attribute with a data record specified by the context attribute representing the response to the context information requested by the context client.

The context graph creation therefore starts with a request from a context client 101 that is passed to the context server 103. The request causes the context server 103 to check if an appropriate context attribute 106 is available to satisfy the context request. If this is not the case, a new context attribute is created and a graph creation is initialised. The context graph creation is handled by the context graph creation means 807 of a configuration means 801. It automatically assembles a context graph structure to feed the given context attribute 106 according to a method described above. Complex optimisation rules can be defined to optimise the graph creation by the context graph creation means 807. Such optimisation rules are e.g. that sensors are preferred, which are owned by the focus entity, or sensors that are less power consuming than others, or costs criteria or the like. Further optimisation of the context graph configuration is performed by the context graph optimisation means 808 of the configuration means 801.

In case the graph creation fails, an error is passed to the context server 103 which will then pass the error further on to the context client 101.

The CI/CS pre-selection means 812 checks which of the context interpreters 108 and context sources 109 can be used for a current context attribute 106. This includes also a first evaluation of the constraints to see if they can be satisfied anyhow. If, e.g., a constraint specifies certain sensors to be used, the availability of those sensors is checked and if they are not available, the respective context interpreter or context source is removed from the list of valid context interpreters and context sources provided for a current context graph. The CI/CS pre-selection means 812 further handles the verification of security restrictions by checking e.g. if the focus entity of the context attribute is allowed to use certain context interpreters and/or context sources. If, e.g., the context attribute refers to the focus entity of a certain user, and the user is not allowed to use a context interpreter that also includes some heavy encryption routines due to a lack of permission, it is removed within the pre-selection process.

A very similar functionality is implemented by the sensor pre-selection means 813 which verifies that only valid sensors are used. Valid sensors are those that the focus entity of the context attribute is allowed to access. If, e.g., the focus entity is a user and the desired information is some kind of location, then the sensor pre-selection means 813 takes care that only location sensors of the user himself are used. The sensor pre-selection means 813 further checks if the required context interpreters and context sources for a sensor are available.

The graph specification is passed to the context graph optimisation means 808 where it is tried to further optimise the context graph configuration as it is set up by the context graph creation means 807. The context graph optimisation means applies more sophisticated optimisation rules to the context graph configuration then it is done in the context graph creation means 807. According to these optimisation rules applied, the context graph optimisation means 808 can reconfigure the context graph and exchange components used in the context graph configuration. For further optimisation of a context graph configuration also information from the CI/CS pre-selection means 812 and the sensor pre-selection means 813 is used.

The optimised context graph configuration is then handed to the context graph validation means 809 which verifies its validity. The context graph validation means 809 checks the consistency of the context graph configuration and the availability of all sensors, context sources and context interpreters used in the graph. The thus validated context graph configuration is then passed to the context graph set-up means 810 which finally instantiates the graph thus implementing the context paths from the sensors 803 to the context attribute 106. The context graph configuration is instantiated by instantiating all context interpreters and context sources appropriately and by setting up the input and output relationships among them. If a set-up fails an error is passed to the context graph creation means 807 thus starting the creation of a new context graph configuration. The instantiation is implemented in two steps. In the first step it is checked what instances are already running and which of the instances can be deployed and the elements that are not running already are then instantiated. In the second step, the elements of the context graph, the sensors 803 and the context attribute 106 are connected to the context graph structure hereby completing the instantiation process. Principally, if any of the processes implemented by one of the means for optimisation, validation or set-up of a graph fails, the respective means produces an error which is propagated back to the graph creation means 807 to start the generation of a new context graph configuration.

As context describes a situation of a focus entity as defined above, a provision of context information is rather a dynamic than a static process. Due to the fact that a context attribute 106 has to provide a valid data record representing the response to a request for context information by a context client 101, modifications in the situation forming a context have to be taken into account. Starting from changes in the context itself, a context graph has to be modified to reflect the changes in the context of the focus entity. The modifications are taken care of by the change management means 811 of the configuration means 801. The change management means 811 uses information from the sensor management 815, the sensor pre-selection 813, the CI/CS management 814, the CI/CS pre-selection 812 and the context graph 802 itself for to check, whether a graph is still valid or not.

Because the validation of a context graph is a dynamic process, it has to be repeated over and over again. There are several occasions on which a graph has to be reconfigured. One is the occurrence of changes in the availability of context interpreters and context sources and above all the availability of sensors. The availability of the components for a context graph can be determined by checking with the CI/CS management means 814 and the sensor management means 815. In case one of the used components of the context graph can no longer be used, the pre-selection of context interpreters and context sources is started again to find a potential replacement.

The CI/CS management means 814 handles the removal and addition of context interpreters and context sources from and to the repository 804 by periodically checking external resources and downloading newly available context interpreter classes and context source classes to the repository 804. It further checks which of the context interpreters and context sources have not been used for a long while and, if storage space becomes scarce, removes them.

The sensor management means 815 keeps track of all available sensors and constantly checks the status of the sensors. This information can be queried and used for the context graph creation process. If a sensor fails or is no longer accessible, the respective information is propagated to the change management 811 which will then try to replace the respective sensor. The sensor management means 815 further tries to find new sensors according to requests from other means of the configuration means 801. It passes the request to external sources like e.g. sensor directories 806.

The change management 811 further optimises context graphs 802 by replacing therein used elements like context interpreters, context sources or sensors with new elements to get e.g. more accurate location information by using a different positioning system. The optimisation criteria can be very complex and can make usage of information given by the clearing house means 816.

For billing and accounting matters, a clearing house means 816 can be implemented in the configuration means 801. The clearing house allows to charge for the usage of external sensors and to bill for an access to internal sensors. It also checks for access restrictions and takes care that these restrictions are reflected in other parts of the system. Information provided by the clearing house means 816 can be used to optimise the context graph configuration for usage costs within the context graph creation means 807 and/or the context graph optimisation means 808. The clearing house means 816 further enables to trade sensor access among different devices thus allowing complex dependencies among context servers. A user e.g. entering a shopping mall can trade some of his profile information to get access to the indoor location sensor system.

Sensors 803 used for a context graph 802 can be distributed over different nodes and accessed remotely. In principal there are two types of sensors, physical sensors and logical sensors. Physical sensors sense any kind of physical data; logical sensors collect information like e.g. the profile of a user.

Figure 9:
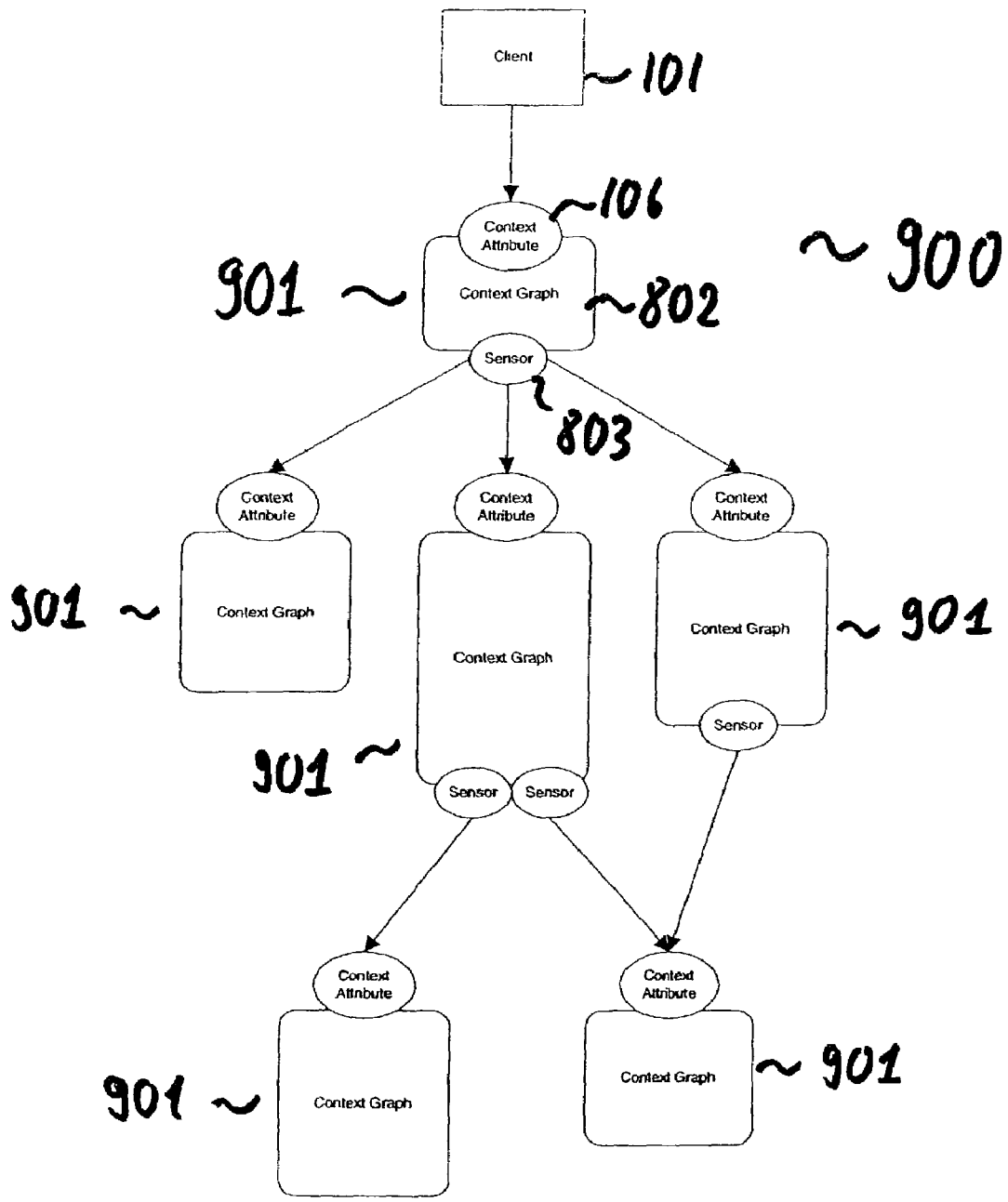
FIG. 9 shows an example for the aggregation of context graphs.

One source for more dynamic sensor configurations are sensors that can for themselves access numerous other context attributes 106 to derive a sensor information. The context attributes used for this purpose can change according to the requirements in the objective target of the sensors. This reuse of external context attributes 106 results in an aggregation of context graphs for which an example is given in FIG. 9. Aggregated context graphs are preferably used when appropriate sub-context-graphs are located on different context servers. When the sub-context-graphs are all located on a single context server, then they can be amalgamated into a monolithic graph by circumventing the context attributes, thus directly connecting the sensors to the first level context interpreters of a sub-graph. Alternatively to sensors also context interpreters can access external context attributes to retrieve information accessible via remote context servers. Also in this case, different independent context graphs are aggregated to a super context graph structure similar to the one obtained by dynamic sensor configurations described further below.

For specific situations, a manual set-up of a context graph configuration will be preferred to a non-automatic set-up. This can be achieved by specifying which context interpreters and context sources or sensors are to be used, or by providing a partial or complete context graph to the configuration means 801 for usage.

For specifying context interpreters or context sources as well as sensors manually the pre-selection means 814 for sensors and/or 812 for context interpreters and context sources are influenced by defining certain filtering rules or by passing a list of specifying the context interpreters, context sources and/or context sensors that are preferably or definitely to be used. A manual intervention can be extended to not only specifying the elements for the context graph creation but specifying further the interconnections between those elements thus passing complete sub-context-graphs to the configuration means 801. Thereby can be specified, if the manually set-up context graph or context sub graph is to be used exclusively or only preferably for a context graph configuration. When a manually created complete context graph is passed to the configuration means 801, only the validation and instantiation of the graph has to be handled by the configuration means 801. The maintenance of the graph is then disabled by reducing its functionality to an error control and passing a possible error directly to the context client 101 without trying to reconfigure a context graph to compensate the error.

Figure 10:
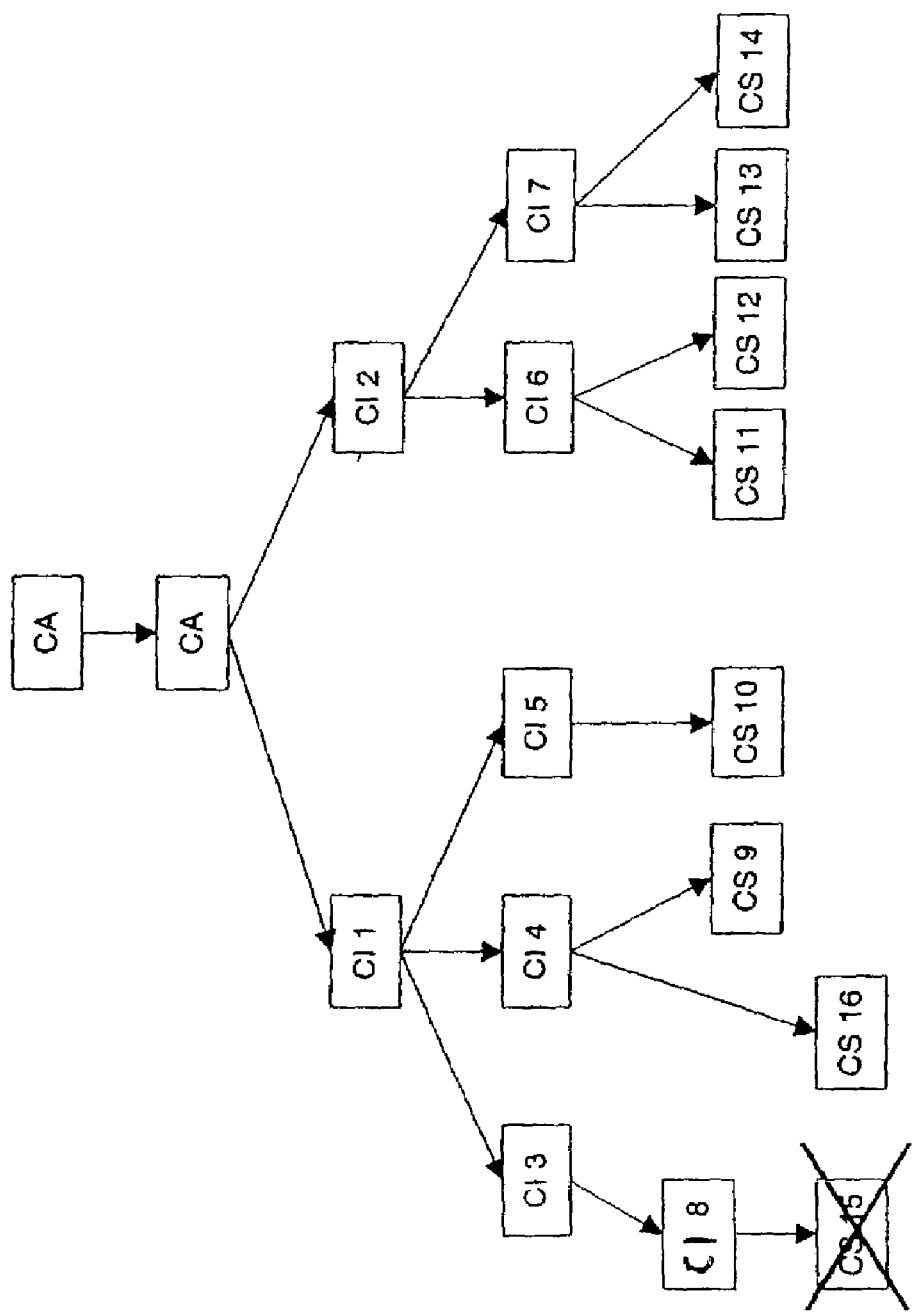
FIG. 10 shows the local branch transposition according to the present invention.

The dynamic adaptation of a context graph to changes in the situation forming the context information resulting in requirements for different sensors, context sources and context interpreters is handled by the change management means 811 using a local branch transposition to modify the context graph and adapt it to the new situation. Assumed a sensor or any other element within the context graph fails, then the context graph up to the position of the failure becomes invalid. The hereby produced error propagates through the whole path up to the next element within the context graph. In FIG. 10 e.g., the context source 15 fails. This error is propagated to the context interpreter 8 from where a new sub graph creation is initialised. If this graph creation fails, the context interpreter 8 also becomes invalid and the new sub graph creation is started from the position of the context interpreter number 3. Assumed the error propagates up to context interpreter 1, then the complete branch beneath context interpreter 1 will have to be recreated. Therefore, local branch transposition means that only those parts being afflicted from a change in the situation are reorganised. The branch beginning with context interpreter number 2 is kept untouched as long as the error is not causing the complete context graph to become invalid. Local branch transposition keeps the branch recreation as local as possible.

Until now interpreters have so far only been considered as a static component with a given kind of inputs and one output. Dynamic context interpreters implement more enhanced capabilities. They are able to change the type of their input and/or output connectors according to external and/or internal conditions.

A dynamic context interpreter will for example change the type of its input connector from a GSM to a GPS location information type when finding out, that the information provided by the GSM-system is not accurate enough. In this occasion, it invalidates its appropriate sub-tree within the context graph as shown in FIG. 10 thus causing a reconfiguration of the branch accordingly.

In a special embodiment of the present invention the performance of the change management of a context graph is further improved by dynamic context interpreters that register themselves at the change management means 811 as an event handler in case that a given sensor fails or becomes unavailable. This is especially advantageous when sensors used to describe the context of a certain user would have to be changed on a permanent basis like for example when the environmental temperature around a user has to be sensed while the user is moving around. When a sensor has to be exchanged, the dynamic context interpreter will create a fake context attribute with the attributes of the now invalidated branch and initialises a context graph creation for the fake context attribute employing the above described context graph creation mechanisms. Upon context graph instantiation, this context graph is hooked up at the fake context attribute and thus to the dynamic context interpreter. In this way numerous reconfiguration steps while the user moves around or because the sensors have only a short range are avoided.

Alternatively, the dynamic context interpreter can select a new sensor at its own by querying the available sensors and selecting an appropriate one. In a simple case like in the above example of monitoring a users environmental temperature, this alternative matter is far more efficient and saves resources. A dynamic context interpreter can further influence the context interpreter/context source pre-selection and sensor preselection when for the reconfiguration of the context graph only certain sensors and/or context interpreters and/or context sources are to be used.

To decide if a sensor is suited for being utilised in a context graph, the sensor management means 815 consults sensor directories kept in a sensor directory repository 806. Sensor directories are servers that provide access to hierarchically structured data. Every information is tacked with attributes. The main purpose of a sensor directory is to provide references to sensors. Sensor directories can be organised in two different ways, the first way groups a number of sensor directories to a sensor directory federation (SDF). The second way structures the sensor directories into hierarchies (SDH).

SDFs are a number of stand alone sensor directories that have a non-replicated, non-redundant information data base. When a request is passed to a member of the SDF the request is at the same time implicitly also sent to each of the other members of the federation thus forming a kind of a virtual server. Sensor directories within a certain floor of a building forming a common pool of sensors are an example for a federation of sensor directories. If one of the sensor directories on this floor is queried, it is also tried to use information from the other sensor directories.

Sensor directories within a sensor directory hierarchy are also non-replicated, non-redundant. In contrary to an SDF, when a request is sent to a sensor directory within an SDH, it is first tried to resolve the request locally. If the sensor directory cannot resolve the request, it hands the request over to its parent sensor directory. This then either tries to resolve the request itself or passes the request to another child sensor directory or even to its own parent sensor directory. For an increased performance the information is cached at different levels in the hierarchy. A lifetime can be set for the query to prevent it from being propagated further up then to a given level in the hierarchy. It has to be noted that an SDH must not necessarily be built-up of single sensor directories but can also contain SDFs.

If the sensor management means 815 detects that a sensor is locally no longer accessible but still available in the sensor directory, it marks this sensor as temporary not available and removes it after some time completely. If the sensor is both not accessible and no longer available in the sensor directory the sensor management means 815 removes it from the list of available sensors immediately.

The invention claimed is:

1. A system providing context information on request comprising:
   a context attribute specifying a type, a format, and a focus entity for a data record representing a response to a request for context information;
   at least one context source providing context data relevant for the request of context information;
   at least one context interpreter configured to establish an interconnection between the context attribute and the context source; and
   a configuration unit configured to keep track of availability and suitability of context sources and context interpreters and set-up a dynamic context graph configuration for assembling the context sources and the context interpreters based on the availability and suitability of the context sources and context interpreters to provide the data record, wherein the configuration unit is further configured to generate the context graph configuration by
   connecting to the context attribute a first context interpreter with an output connector matching the input connector of the context attribute or a context source with an output connector matching the input connector of the context attribute,
   connecting, upon usage of the first context interpreter, each of the input connectors of the first context interpreter to an output of a context interpreter matching the respective input connector or to an output connector of a context source matching the respective input connector, and
   connecting each of the input connectors of a context interpreter not yet connected to an output connector of a context source or to an output connector of a context interpreter to an output of a context interpreter matching the respective input connector or to a context source with an output connector matching the respective input connector.

2. The system providing context information according to claim 1, further comprising:
   a feedback function configured to connect an input connector of a context interpreter to an output connector of a different context interpreter already connected to an input connector of a further context interpreter or to an input of a context attribute present in the context graph configuration.

3. The system providing context information according to claim 2, wherein:
   a condition for creating the feedback function is specified by a constraint defined for the context interpreter, and an implementation of the feedback function is specified by a corresponding constraint-event defined for the context interpreter.

4. The system providing context information according to claim 1, wherein a repository containing a plurality of available context interpreters and context sources is configured to provide the context interpreters and the context sources to the configuration unit.

5. The system providing context information according to claim 1, wherein the context sources are configured to access sensors providing physical data and/or information data.

6. The system providing context information according to claim 1, wherein the configuration unit is further configured to set-up the context graph configuration in compliance to predefined optimisation rules.

7. The system providing context information according to claim 1, a graph-cache provides pre-configured context graph configurations for use by the configuration unit.

8. The system providing context information according to claim 1, wherein the focus entity defined for an input connector and/or output connector of a context interpreter or a context source to be used within a context graph is implemented as a variable to be bound to a real value upon initialisation of the context graph.

9. The system providing context information according to claim 1, wherein a context interpreter is configured to modify a type of its input connector and/or a type of its output connector according to changes in the availability or characteristics of data requested and/or received.

10. The system providing context information according to claim 1, wherein the configuration unit further comprises a context graph creation unit configured to automatically assemble a context graph for a given context attribute.

11. The system providing context information according to claim 1, wherein the configuration unit further comprises a change management unit configured to control a reconfiguration of a context graph upon changes in the availability and/or suitability of an element within the context graph.

12. The system providing context information according to claim 1, wherein the configuration unit further comprises a context graph optimisation unit configured to control the set-up of a context graph according to a system of rules.

13. The system providing context information according to claim 1, wherein the configuration unit further comprises a context graph validation unit configured to verify a consistency of a context graph and availability of elements used within the context graph.

14. The system providing context information according to claim 1, wherein the configuration unit further comprises a context graph set-up unit configured to instantiate the context interpreters and context sources in a context graph.

15. The system providing context information according to claim 1, wherein the configuration unit further comprises a pre-selection unit configured to select context sources and context interpreters suited for creating a context graph for a given context attribute.

16. The system providing context information according to claim 1, wherein the configuration unit further comprises a sensor pre-selection unit configured to select sensors to be used with context sources suited for creating a context graph for a given context attribute.

17. The system providing context information according to claim 11, wherein the configuration unit further comprises a sensor management unit configured to monitor a status and the availability of each sensor used for a context graph and forwarding the status and the availability to the change management unit.

18. The system providing context information according to claim 1, wherein the configuration unit further comprises an access control unit configured to enforce access restrictions imposed on a usage of a component in the context graph.

19. The system providing context information according to claim 1, wherein the configuration unit further comprises an accounting unit configured to charge a focus entity for a usage of sensors and elements used for a context graph.

20. The system providing context information according to claim 1, wherein at least one pre-defined context graph is linked to the context graph being set-up.

21. A software product stored in a computer-readable medium adapted to implement a system providing context information on request according to claim 1 on a data handling device when being executed by a processing means of the data handling device.

22. A method for providing context information on request comprising:
    specifying a type, a format, and a focus entity in a context attribute for a data record representing a response to a request for context information;
    locating one or more context sources providing context data relevant for said request of context information;
    locating one or more context interpreters for processing said provided context data related to said focus entity into the specified type and format for said data record;
    tracking availability and suitability of context sources and context interpreters to provide said data record; and
    setting-up a dynamic context graph configuration for assembling context sources and context interpreters based on the availability and suitability to provide said data record,
wherein the setting-up of the dynamic context graph further comprises
    connecting to the context attribute a first context interpreter with an output connector matching the input connector of the context attribute or a context source with an output connector matching the input connector of the context attribute,
    connecting, upon usage of the first context interpreter, each of the input connectors of the first context interpreter to an output of a context interpreter matching the respective input connector or to an output connector of a context source matching the respective input connector, and
    connecting each of the input connectors of a context interpreter not yet connected to an output connector of a context source or to an output connector of a context interpreter to an output of a context interpreter matching the respective input connector or to a context source with an output connector matching the respective input connector.

23. The method according to claim 22, further comprising:
    Constantly monitoring the availability and suitability of each context source and/or each context interpreter.

24. The method according to claim 22, further comprising:
    invalidating and reconstructing a part of the context graph configuration constituted by a failed context source if a context source and/or a context interpreter is detected to fail by no longer being available and/or being unsuited to provide or process context data.

* * * * *